(12) United States Patent
Abraham et al.

(10) Patent No.: US 10,747,629 B2
(45) Date of Patent: Aug. 18, 2020

(54) LINEAR VIEW-CHANGE BFT WITH OPTIMISTIC RESPONSIVENESS

(71) Applicant: VMware, Inc., Palo Alto, CA (US)

(72) Inventors: Ittai Abraham, Tel Aviv (IL); Dahlia Malkhi, Palo Alto, CA (US); Guy Golan Gueta, Holon (IL); Maofan Yin, Ithaca, NY (US); Michael Reiter, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 22 days.

(21) Appl. No.: 16/234,552

(22) Filed: Dec. 27, 2018

(65) Prior Publication Data

US 2019/0377645 A1 Dec. 12, 2019

Related U.S. Application Data (63) Continuation-in-part of application No. 16/005,351, filed on Jun. 11, 2018.

(51) Int. Cl.
| | |
|---|---|
| *G06F 11/07* | (2006.01) |
| *G06F 11/14* | (2006.01) |
| *G06F 11/18* | (2006.01) |
| *G06F 11/20* | (2006.01) |

(52) U.S. Cl.
CPC ...... *G06F 11/1482* (2013.01); *G06F 11/0757* (2013.01); *G06F 11/182* (2013.01); *G06F 11/183* (2013.01); *G06F 11/187* (2013.01); *G06F 2201/82* (2013.01)

(58) Field of Classification Search
USPC ........................................................ 714/4.3
See application file for complete search history.

(56) References Cited

U.S. PATENT DOCUMENTS

| | | | | |
|---|---|---|---|---|
| 6,671,821 | B1 * | 12/2003 | Castro ................... | G06F 21/577 714/4.3 |
| 7,334,154 | B2 * | 2/2008 | Lorch ................... | G06F 11/182 714/11 |
| 2012/0254412 | A1 * | 10/2012 | Goose ................... | G06F 9/5072 709/224 |

(Continued)

OTHER PUBLICATIONS

Miguel Castro, et al. "Practical Byzantine Fault Tolerance" Proceedings of the 3rd Symposium on OSDI, Feb. 1999, 14 pages.

(Continued)

*Primary Examiner* — Chae M Ko (57) ABSTRACT

Techniques for implementing linear view-change with optimistic responsiveness in a BFT protocol running on a distributed system comprising n replicas are provided. According to one set of embodiments, the replicas can execute, during a view v of the BFT protocol, a first voting round comprising communicating instances of a first type of COMMIT certificate among the replicas. Further, when 2f+1 instances of the first type of COMMIT certificate associated with view v have been received by the replicas, the replicas can execute a second voting round comprising communicating instances of a second type of COMMIT certificate among the replicas. If 2f+1 instances of the second type of COMMIT certificate associated with view v are not received by the replicas within a predetermined timeout period, a view change can be initiated from view v to a view v+1.

21 Claims, 5 Drawing Sheets

(56) References Cited

U.S. PATENT DOCUMENTS

| | | | |
|---|---|---|---|
| 2018/0157558 A1* | 6/2018 | Karame | G06F 11/2058 |
| 2018/0307573 A1 | 10/2018 | Abraham et al. | |
| 2019/0018984 A1* | 1/2019 | Setty | H04L 63/123 |
| 2019/0097790 A1* | 3/2019 | Li | H04L 9/085 |
| 2019/0129809 A1 | 5/2019 | Basu et al. | |
| 2019/0243963 A1* | 8/2019 | Soriente | G06F 21/606 |
| 2019/0288993 A1* | 9/2019 | Lin | H04L 41/0668 |
| 2019/0294514 A1* | 9/2019 | Tang | G06F 11/2033 |

OTHER PUBLICATIONS

Ramakrishna Kotla, et al. "Zyzzyva: Speculative byzantine Fault Tolerance" SOSP, Oct. 2007, 14 pages.

Alysson Bessani, et al. "State Machine Replication for the Masses with FT-SMaRT", Proceedings of IEEE/IFIP, Dec. 2013, 15 pages.

Rafael Pass, et al. "Hybrid Consensus: Efficient Consensus in the Permissionless Model" Cryptology ePrint Archive, downloaded Dec. 13, 2018, 56 pages.

Rafael Pass, et al. Thunderella: Blockchains With Optimistic Instant Confirmation, downloaded Dec. 13, 2018, 39 pages.

Guy golan-Gueta, et al. "SBFT: A Scalable Decentralized Trust Infrastructure for Blockchains" CoRR, Apr. 4, 2018, 23 pages.

Ethan Buchman "Tendermint: Byzantine Fault tolerance in the Age of Blockchains", University of Guelph, Jun. 2016, 109 pages.

Vitalik Buterin, et al. "Casper the Friendly Finality Gadget" CoRR, Nov. 22, 2018, 10 pages.

Juan Garay, et al. "The Bitcoin Back-Bone Protocol: Analysis and Applications" Eurocrypt, Oct. 13, 2018, 44 pages.

Ittay Eyal, et al. "Bitcoin-ng: A Scalable Blockchain Protocol", NSDI, Mar. 16-18, 2016, 16 pages.

Eleftherios Kokoris-Kogias, et al. "Enhancing Bitcoin Security and Performance With Strong Consistency via Collective Signing", CoRR, Aug. 10-12, 2016, 19 pages.

Yossi Gilad, et al. "Algorand: Scaling Byzantine Agreements for Cryptocurrencies", SOSP, downloaded Dec. 13, 2018, 15 pages.

Hanke, et al. "Dfinity technology Overview Series-Consensus System", www.difinity.org, Jan. 23, 2018, 16 pages.

Ethan Buchman, et al. "The Latest Gossip on BFT Consensus", www.arxiv.org, Jul. 13, 2018, 14 pages.

Cynthia Dwork, et al. Consensus in the Presence of partial Synchrony, ACM, Apr. 1988, 36 pages.

Leslie Lamport, et al. "The Byzantine Generals Problem", ACM, downloaded Dec. 13, 2018, 38 pages.

Pease, et al. "Reaching Agreement in the Presence of Faults", ACM, Apr. 1980, 7 pages.

Danny Dolev, et al. "Bounds on Information Exchange for Byzantine Agreement", ACM, downloaded Dec. 13, 2018, 9 pages.

Katz, et al. "On Expected Constant-round Protocols for Byzantine Agreement", Journal of computer and System Sciences, downloaded Dec. 13, 2018, 27 pages.

Michael Fischer, et al. "Impossibility of Distributed Consensus with One Faulty Process", ACM, Apr. 1985, 9 pages.

Michael Ben-Or, et al. "Another Advantage of Free Choice: Completely Asynchronous Agreement Protocols", ACM, downloaded Dec. 13, 2018, 4 pages.

Christian Cachin, et al. "Random Oracles in Constantinople: Practical Asynchronous Byzantine Agreement Using Cryptography", Aug. 14, 2000, 26 pages.

Leslie Lamport "Time, clocks, and the Ordering of Events in a Distributed System", ACM, Jul. 1978, 8 pages.

Schneider "Implementing Fault-Tolerant Services Using the State Machine Approach: A Tutorial" ACM, Dec. 1990, 21 pages.

Leslie Lamport "The Part-Time Parliament" ACM, May 1998, 33 pages.

Allen Clement, et al. "Upright Cluster Services" ACM, Oct. 2009, 14 pages.

Ittai Abraham, et al. "Revisiting Fast Practical Byzantine Fault Tolerance", CoRR, Dec. 6, 2017, 13 pages.

Ittai Abraham, et al. "Revisiting Fast Practical Byzantine Fault Tolerance: Thelma, Velma and Zelma", CoRR, Jan. 31, 2018, 15 pages.

Michael Reiter, "The Rampart Toolkit for building High-Integrity Services" downloaded Dec. 13, 2018, 14 pages.

HariGovind Ramasamy, et al. "Parsimonious Asynchronous Byzantine-Fault-tolerant Atomic Broadcast" OPODIS, Aug. 19, 2005, 19 pages.

Andrew Miller, et al. "The Honey Badger of BFT Protocols" ACM, downloaded Dec. 13, 2018, 15 pages.

Santoshi Nakamoto "Bitcoin: A Peer-To-Peer Electronic Cash System" www.bitcoin.org, Nov. 21, 2013, 30 pages.

Rafael Pass, et al. "Analysis of the Blockchain Protocol in Asynchronous Networks" Eurocrypt, Sep. 13, 2016, 40 pages.

Ittai Abraham, et al. "The Blockchain Consensus Layer and BFT", www.bulletin.eatcs.org, downloaded Dec. 13, 2018, 22 pages.

Miguel Castro, et al. "Practical Byzantine Fault tolerance and Proactive Recovery", ACM, Nov. 2002, 64 pages.

Victor Shoup "Practical Threshold Signatures" Eurocrypt, May 2000, 14 pages.

Dan Boneh, et al. "Short Signatures From the Weil Pairing" Asiacrypt, Dec. 2001, 19 pages.

Holzmann, et al. "Swarm Verification Techniques", IEEE, Nov./Dec. 2011, 13 pages.

Holzmann "An Improved Protocol Reachability Analysis Technique" Software, Practice and Experience, vol. 18, No. 2, Jan. 1988, 19 pages.

Holzmann "An Analysis of Bitstate Hashing" Formal Methods in System Design, Nov. 1998, 16 pages.

Ttai Abraham, et al., VMware Research, "Efficient Synchronous Byzantine Consensus", Sep. 24, 2017, 19 pages.

Wenbing Zhao, "A Byzantine Fault Tolerant Distributed Commit Protocol", Third IEEE International Symposium on Dependable, Autonomic and Secure Computing, 8 pages, 2007.

Giuliana Santos Veronese et al., "Efficient Byzantine Fault-Tolerance", IEEE Transactions on Computers, vol. 62, No. 1, Jan. 2013.

Related U.S. Appl. No. 16/005,351, filed Jun. 11, 2018, Notice of Allowance dated Mar. 25, 2020.

* cited by examiner

LINEAR VIEW-CHANGE BFT WITH OPTIMISTIC RESPONSIVENESS

CROSS-REFERENCES TO RELATED APPLICATIONS

The present application is a continuation-in-part of U.S. patent application Ser. No. 16/005,351 filed Jun. 11, 2018, entitled "Linear View-Change BFT", the contents of which is incorporated herein by reference in its entirety.

BACKGROUND

Byzantine fault tolerance (BFT) refers to the ability of a computing system to endure arbitrary (i.e., Byzantine) failures that would otherwise prevent the system's components from reaching consensus on decisions critical to the system's operation. In the context of state machine replication (i.e., a scenario where a system provides a replicated service whose operations and state are mirrored across multiple nodes, known as replicas), BFT protocols are used to ensure that non-faulty replicas are able to agree on a common order of execution for client-initiated service operations. This, in turn, ensures that the non-faulty replicas will run in an identical and thus consistent manner.

One well-known BFT protocol that is used in the state machine replication context is Practical BFT (PBFT) (see Castro et al., "Practical Byzantine Fault Tolerance," available at http://pmg.csail.mit.edu/papers/osdi99.pdf, incorporated herein by reference for all purposes). Generally speaking PBFT and its variants operate according to a sequence of "views," which can be understood as phases in the protocol's determination of a single consensus decision. In each view, one replica, referred as a proposer, sends a proposal for a decision value (e.g., operation sequence number) to the other replicas and attempts to get 2f+1 replicas to agree upon the proposal, where f is the maximum number of replicas that may be faulty. If this succeeds, the proposal becomes a consensus decision (i.e., a decision that is deemed to be agreed upon by a consensus of the replicas). However, if this does not succeed (due to, e.g., a proposer failure), the replicas enter a "view-change" procedure that causes a new, subsequent view to be entered/initiated. In the subsequent view, a new proposer is selected and the new proposer transmits a new proposal comprising votes received from replicas in the prior view, and the process above is repeated until a consensus decision is reached.

Unfortunately, the transmission of the new proposal incurs a relatively high communication bit complexity of $n^3$, where n corresponds to the total number of replicas. In addition, the view-change procedure can recur $O(n)$ times due to a cascade of up to f proposer failures. Thus, in conventional PBFT, the total amount of bits that may need to be transmitted as part of one or more view-changes before a single consensus decision is reached is $O(n^4)$, which can pose significant scalability issues for even moderate system sizes (e.g., n=100).

SUMMARY

Techniques for implementing linear view-change with optimistic responsiveness in a Byzantine Fault Tolerant (BFT) protocol running on a distributed system comprising n replicas are provided. According to one set of embodiments, the replicas can execute, during a view v of the BFT protocol, a first voting round comprising communicating instances of a first type of COMMIT certificate among the replicas. Further, when 2f+1 instances of the first type of COMMIT certificate associated with view v have been received by the replicas, the replicas can execute a second voting round comprising communicating instances of a second type of COMMIT certificate among the replicas. If 2f+1 instances of the second type of COMMIT certificate associated with view v are not received by the replicas within a predetermined timeout period, a view change can be initiated from view v to a view v+1.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide a more efficient scheme for performing view-changes in PBFT and other similar BFT protocols. This scheme is referred to herein as "linear view-change," or LVC. At a high level, LVC avoids the need to transmit $O(n^4)$ bits in order to carry out one or more view-changes and reach a consensus on a single decision; instead, the transmission of only $O(n^3)$ bits is needed ($O(n^2)$ bits per view-change, recurring up to n times). If PBFT is implemented with an existing feature known as threshold signatures, the use of LVC requires the transmission of only $O(n^2)$ bits ($O(n)$ bits per view-change, recurring up to n times). Thus, LVC provides an $O(n)$ improvement in communication bit complexity over the current view-change procedure in PBFT (with or without threshold signatures).

In certain embodiments, LVC can also guarantee the property of optimistic responsiveness, which states that at the time of a view-change, the new proposer (if non-faulty) only needs to wait for n-f responses (i.e., NEW-VIEW messages) from other replicas in order to create a new proposal that will make forward progress (i.e., will be accepted by non-faulty replicas). These and other aspects of the present disclosure are detailed in the sections that follow.

2. System Environment and Existing PBFT Protocol

Figure 1:
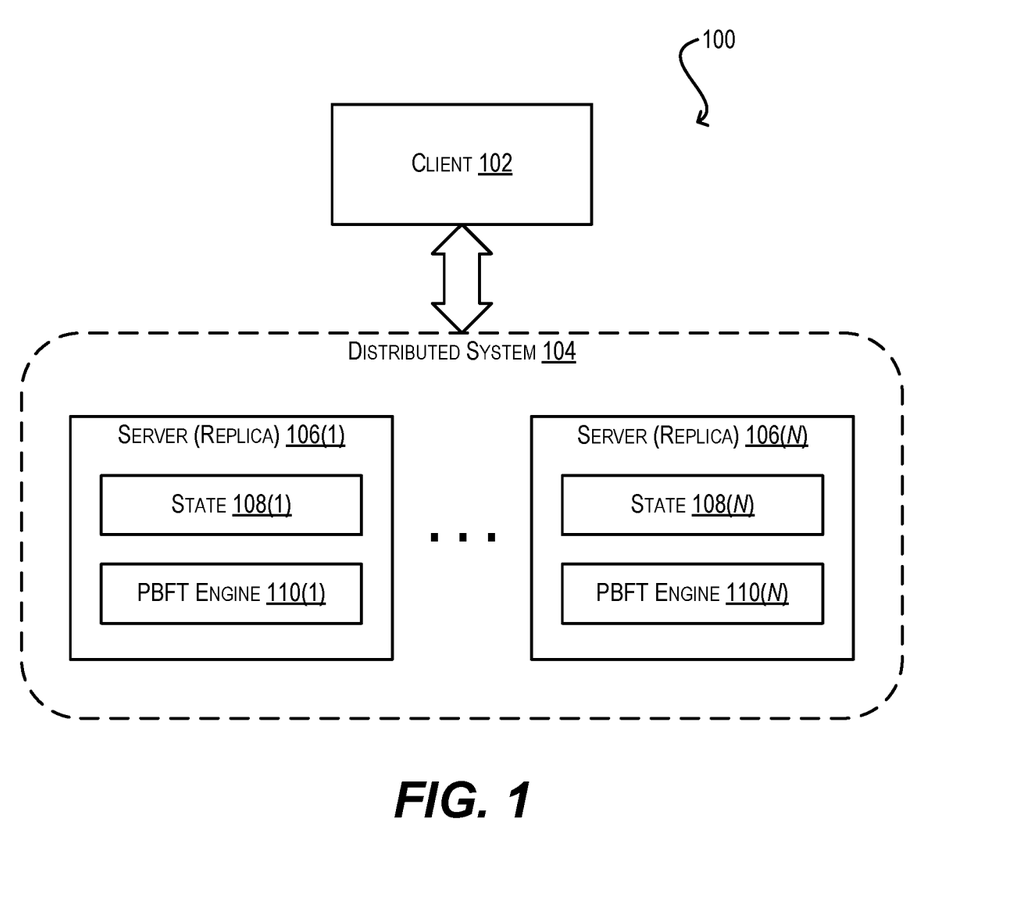
FIG. 1 depicts a system environment according to certain embodiments.

FIG. 1 is a simplified block diagram of a system environment 100 in which embodiments of the present disclosure may be implemented. As shown, system environment 100 includes a client 102 and a distributed system 104 comprising a plurality of n servers 106(1)-(n). Each server 106 may be a physical or virtual machine and is configured to run an identical instance of a replicated service (e.g., a data storage service, a blockchain service, etc.) provided by distributed system 104. Accordingly, each server 106 is referred to as a replica and includes replicated state 108 pertaining to its service instance. Client 102 is configured to consume the replicated service provided by distributed system 104 and thus submits, to replicas 106(1)-(n), requests to carry out service operations. Upon receiving these requests, each replica 106 executes the operations and updates its respective state 108 to reflect the results of those operations.

To ensure that replicas 106(1)-(n) sequence the execution of operations received from client 102 in a consistent fashion, distributed system 104 implements a BFT protocol via engines 110(1)-(n) residing on replicas 106(1)-(n). In FIG. 1, engines 110(1)-(n) specifically implement PBFT; however, distributed system 104 can use any one of a number of known BFT protocols that are similar to PBFT for this purpose. It is assumed that the total number of replicas n in distributed system 104 is greater than or equal to 3f+1 (where f is the maximum allowable number of faulty replicas) and that the PBFT protocol implemented via engines 110(1)-(n) provides at least two guarantees: (1) if a non-faulty replica assigns a particular sequence number to an operation, then all replicas will assign the same sequence number to that operation (i.e., safety), and (2) every operation will eventually be assigned a sequence number (i.e., liveness).

Figure 2:
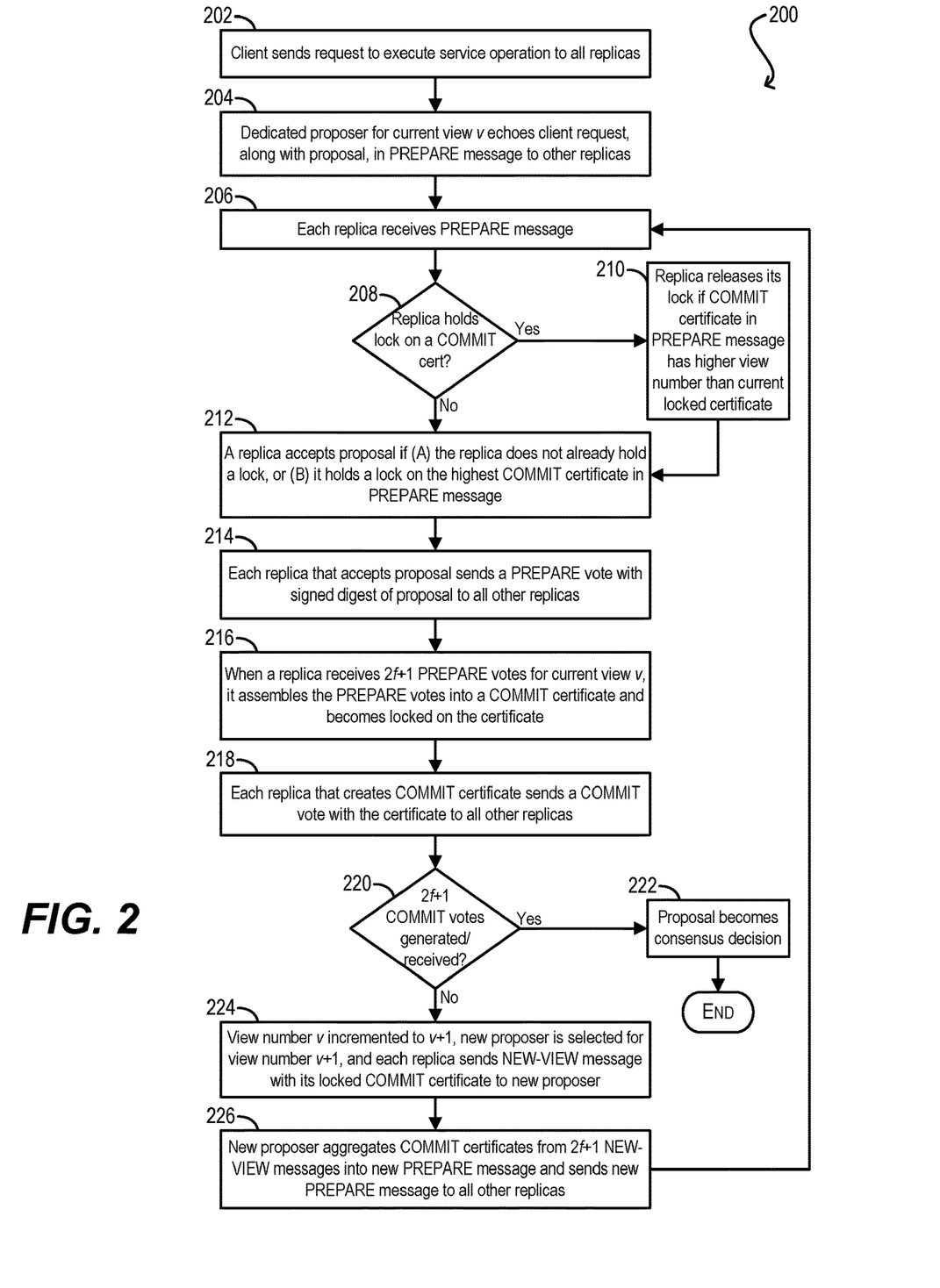
FIG. 2 depicts a PBFT workflow for a single consensus slot according to certain embodiments.

To explain how existing PBFT operates, FIG. 2 depicts a workflow 200 that illustrates the conventional protocol processing performed by replicas 106(1)-(n) via PBFT engines 110(1)-(n) for reaching consensus on a single decision, such as agreeing on the sequence number for a single client service request. This sometimes referred to as the PBFT processing for a "single consensus slot." Workflow 200 assumes that the messages passed between replicas 106(1)-(n) are digitally signed using standard cryptographic signatures to ensure the authenticity of each message.

Starting with block 202, client 102 sends a request to execute a service operation to all replicas 106(1)-(n). At block 204, a dedicated proposer (selected from among replicas 106(1)-(n)) for a current view number v of the protocol echoes the client request, along with a proposed sequence number for the request (referred to as a proposal), in a PREPARE message to all other replicas. View number v is a monotonically increasing number which may begin at any initial value, such as 1.

At block 206, each replica receives the PREPARE message from the proposer. If this PREPARE message is from a proposer selected after a view-change, the PREPARE message will carry 2f+1 COMMIT certificates (explained below). In this case, if the replica holds a "lock" on a COMMIT certificate (block 208) the replica will release its lock if the PREPARE message has a COMMIT certificate having a higher view number than the replica's current locked certificate (block 210). Then at block 212, the replica accepts the proposal if either (a) the replica does not currently hold any lock, or (b) it already holds a lock on the highest COMMIT certificate in the PREPARE message (i.e., the COMMIT certificate having the highest view number). Upon accepting the proposal, the replica sends a PREPARE vote with a signed digest of the proposal to all other replicas (block 214). The transmission of this PREPARE vote by the replicas is referred to herein as the "PREPARE voting round" for current view v.

At block 216, when a replica receives 2f+1 PREPARE votes for the current view number v, it assembles the PREPARE votes into a COMMIT certificate. Thus, this COMMIT certificate can be understood as a vector of 2f+1 values, each corresponding to a received PREPARE vote (or a digest thereof). The COMMIT certificate is associated with a view number corresponding to the view in which the certificate is created. Thus, the COMMIT certificate created at block 216 is associated with (or is said to have/correspond to) current view number v. The replica becomes "locked" on the COMMIT certificate at this point, which means that the replica believes the proposal embodied by the PREPARE votes in the COMMIT certificate is the correct consensus decision. The replica then sends a COMMIT vote with the COMMIT certificate to all other replicas (block 218). The transmission of this COMMIT vote by the replicas is referred to herein as the "COMMIT voting round" for current view v.

At block 220, if 2f+1 COMMIT votes are generated/received by the replicas for a given COMMIT certificate within a predetermined timeout period, the proposal embodied in the COMMIT certificate becomes a consensus decision for the client request (in other words, the proposal is deemed to be agreed upon by all non-faulty replicas) (block 222) and workflow 200 ends.

However, if 2f+1 COMMIT votes are not generated/received by the replicas for a given COMMIT certificate within the predetermined timeout period, the current view number v is incremented to v+1, a new proposer is selected for view number v+1, and each replica sends a NEW-VIEW message carrying the COMMIT certificate it is locked on (if any) to the new proposer (block 224). This NEW-VIEW message signifies the initiation of a view-change to the next view number v+1.

Upon receiving 2f+1 NEW-VIEW messages from the various replicas, the new proposer aggregates the COMMIT certificates from the NEW-VIEW messages into a new PREPARE message (resulting in 2f+1 COMMIT certificates in the new PREPARE message) and transmits the new PREPARE message to all of the other replicas (block 226). Finally, workflow 200 returns to block 206 and the process repeats until a consensus decision is reached.

3. PBFT with LVC

As mentioned in the Background section, because the new proposer transmits, within the new PREPARE message, 2f+1 COMMIT certificates (each comprising 2f+1 PREPARE votes) to all of the other replicas at the time of a view-change, the communication bit complexity of the view-change is $O(n^3)$-$O(n)$ for the PREPARE votes per COMMIT certificate, $O(n)$ for the COMMIT certificates themselves, and $O(n)$ for the message broadcast to the other replicas. Further, the view-change can recur up to f times (due to f proposer failures) before a consensus decision is reached for the client request, resulting in a total communication bit complexity of $O(n^4)$. While this degree of overhead is only encountered in the case of one or more unstable/faulty proposers, it is still undesirable for several reasons. For example, in some PBFT variants, view-changes may be employed even without proposer failures in order to promote fairness and protected against undetectable performance degradation attacks. Additionally, for even moderate system sizes (e.g., n=100), being hit with 100,000,000 transmissions in order to teach a single consensus decision is a significant scalability barrier.

Figure 3:
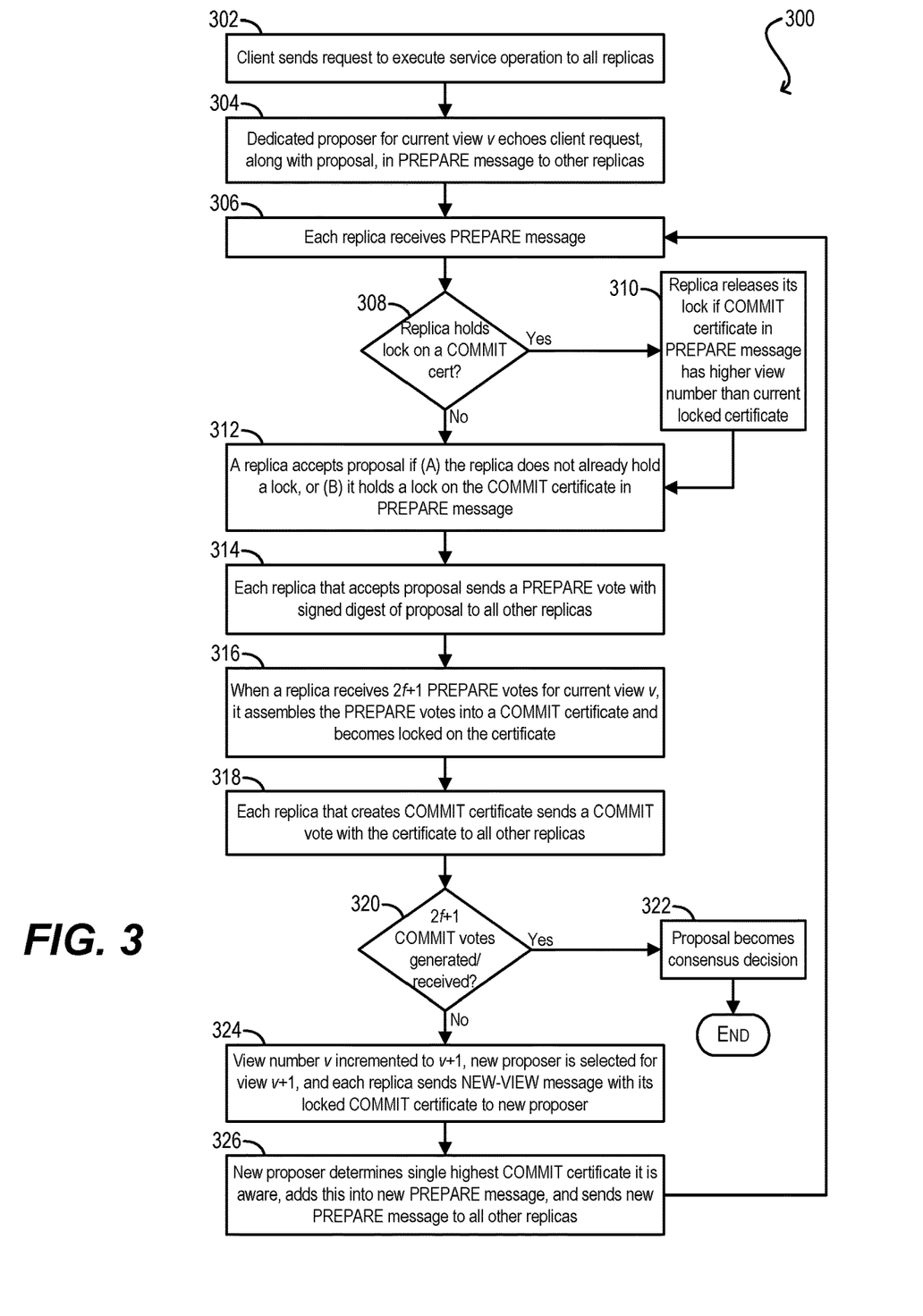
FIG. 3 depicts a version of the PBFT workflow of FIG. 2 that has been enhanced to implement LVC according to certain embodiments.

To address this, FIG. 3 depicts a modified version of the PBFT protocol workflow 200 of FIG. 2 (i.e., workflow 300) that implements linear view-change, or LVC, according to an embodiment. Several of the steps of workflow 300 are similar to the corresponding steps of workflow 200. However, at block 324, the new proposer does not aggregate 2f+1 COMMIT certificates (from the NEW-VIEW messages received from the other replicas) into the new PREPARE message as in block 224 of workflow 200; instead, the new proposer determines the single highest COMMIT certificate that it is aware of (i.e., the COMMIT certificate associated with the highest, or most recent, view number) and adds this highest COMMIT certificate into the new PREPARE message. This highest COMMIT certificate may be the highest one from among the certificates received in the NEW-VIEW messages received by the new proposer, or it may simply be the new proposer's own locked COMMIT certificate. The new proposer then transmits the PREPARE message with the highest COMMIT certificate to all other replicas at block 304.

Since the PREPARE message created at block 326 only includes a single COMMIT certificate comprising 2f+1 PREPARE votes, the communication bit complexity of this transmission is only $O(n^2)$, in contrast to $O(n^3)$ in PBFT workflow 200 of FIG. 2. Further, assuming up to f proposer failures, the overall complexity is only $O(n^3)$, in contrast to $O(n^4)$ in workflow 200. Thus, this LVC enhancement results in a linear improvement in complexity over conventional PBFT, which can be substantial for even moderate sizes of n.

It should be noted that, even with this LVC modification, the safety of the PBFT protocol is conserved. This is because, per block 310, a correct (i.e., non-faulty) replica will release a lock on its currently locked COMMIT certificate only if the COMMIT certificate included in the PREPARE message has a higher view number than the locked certificate; otherwise, the replica will keep its existing lock. Stated another way, a correct replica will decline the new proposal embodied in the PREPARE message if it already holds a lock on a COMMIT certificate prepared during a more recent view than the COMMIT certificate included in the PREPARE message. Thus, even if the new proposer is faulty and attempts to hide the highest COMMIT certificate it is aware of, the proposer simply risks being declined by the non-faulty replicas and cannot damage the safety of the protocol.

In addition. it should be noted that while workflow 300 of FIG. 3 depicts the implementation of LVC within PBFT, this concept may also be applied to any other BFT protocol that makes use of a similar view-change mechanism as PBFT. Some PBFT variants implement a speculative fast track or threshold signatures in order to improve communication complexity; in these variants, LVC can be used to further reduce the communication bit complexity of view-changes, on top of whatever reduction is already achieved by those other features. For example, the use of threshold signatures in PBFT reduces the communication bit complexity of a view-change to $O(n^2)$ and the overall complexity (in the face of f failures) to $O(n^3)$. Thus, if LVC is implemented in conjunction with threshold signatures, the communication bit complexity of a view change and the overall complexity can be further reduced to $O(n)$ and $O(n^2)$ respectively.

4. Guaranteeing Optimistic Responsiveness

One limitation with the LVC implementation shown in FIG. 3 is that it does not guarantee the property of optimistic responsiveness, which states that a new non-faulty proposer needs to wait for just the first n-f responses (i.e., NEW-VIEW messages) from other replicas in order to ensure that it can create a new proposal that will make progress. To understand this, consider the following scenario:

During a view number X, a view-change is initiated at a time when all but at least one non-faulty replica (i.e., replica R) have not yet locked on a COMMIT certificate corresponding to view number X—in other words, replica R has locked on a COMMIT certificate for view number X but all other non-faulty replicas are still locked on a COMMIT certificate having a view number less than X Upon the view-change to subsequent view X+1, the new proposer receives the first 2f+1(i.e., n-f in the case where n=3f+1) NEW-VIEW messages from other replicas, where each received NEW-VIEW message comprises a COMMIT certificate having a view number less than X (i.e., none of the first 2f+1 NEW-VIEW messages are from replica R)

The new proposer creates a PREPARE message with the highest COMMIT certificate it is aware of at this point (i.e., a COMMIT certificate having a view number less than X) and sends the PREPARE messages to the replicas In this scenario, the non-faulty replicas locked on a COMMIT certificate less than X will accept the proposal, but replica R will not accept the proposal because it is locked on a COMMIT certificate having view number X (which is greater than the COMMIT certificate in the PREPARE message). This can stall forward progress of the protocol because if all f faulty replicas also reject the proposal, n-f PREPARE votes may never be generated/received (and this can potentially repeat for subsequent views).

Figure 4A:
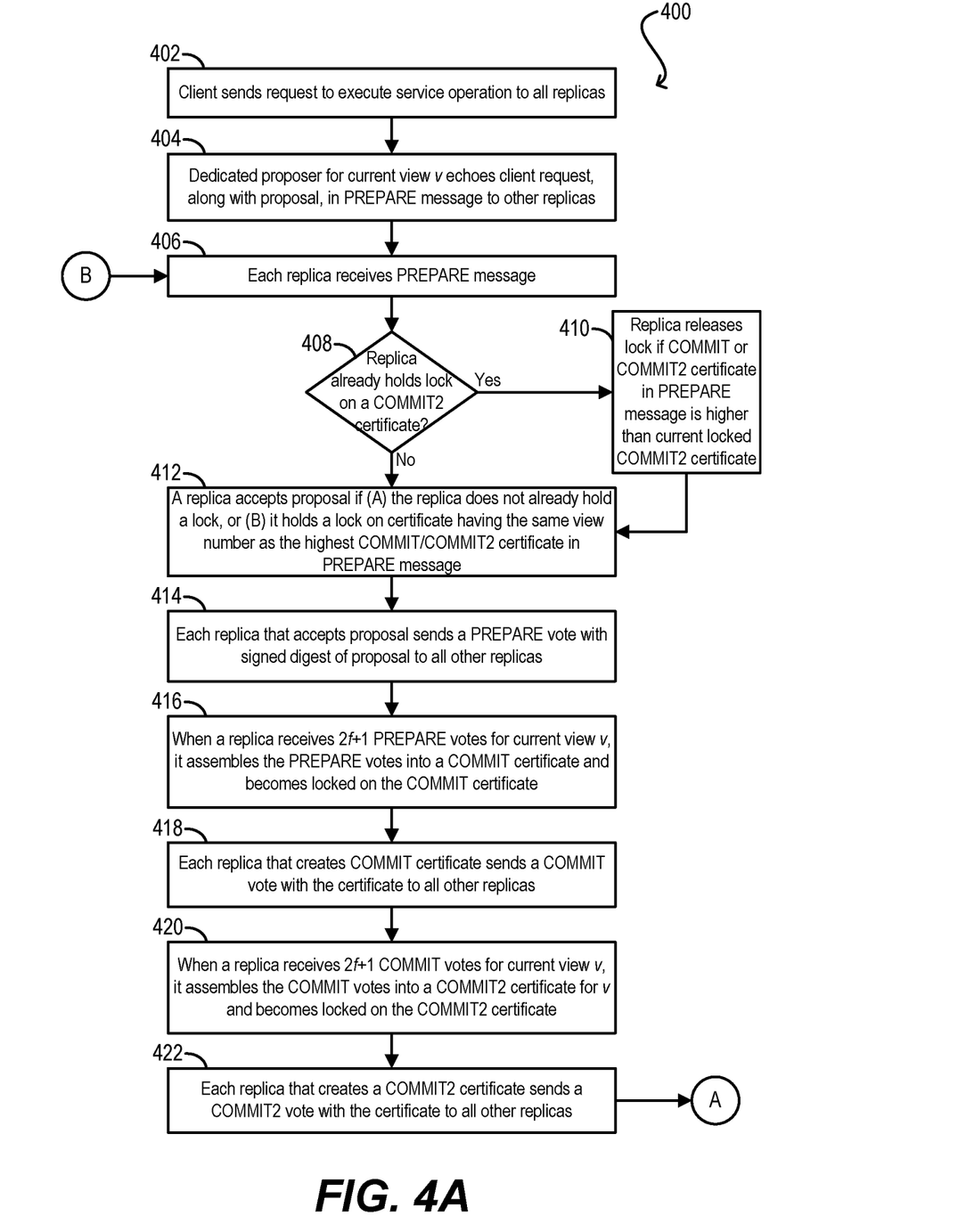
FIGS. 4A and 4B depict a version of the PBFT workflow of FIG. 2 that has been enhanced to implement LVC with optimistic responsiveness according to certain embodiments.
Figure 4B:
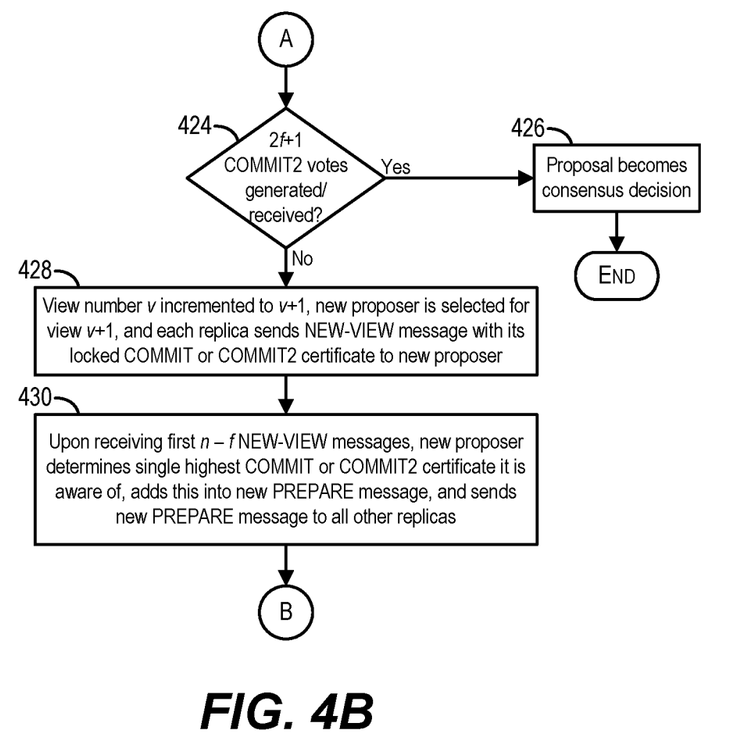

To address this and other similar problems, FIGS. 4A and 4B depict a PBFT protocol workflow 400 that incorporates the LVC modifications from FIG. 3 but also implements a second COMMIT voting round (referred to as the "COMMIT2" voting round) after the initial COMMIT voting round. With the addition of this COMMIT2 voting round, the distributed system can guarantee that a new proposer will be able to generate a proposal that makes progress after receiving only n-f NEW-VIEW messages from other replicas.

Blocks 402-406 and 414-418 of workflow 400 (shown in FIG. 4A) are substantially similar to blocks 302-306 and 314-318 of workflow 300 and thus are not re-explained here (note that blocks 408-412, which are different from workflow 300, are discussed below). At block 420 of FIG. 4A, when a replica receives 2f+1 COMMIT votes for current view number v (which signals the end of the COMMIT voting round), the replica assembles the received COMMIT votes into a second type of COMMIT certificate (i.e., a "COMMIT2 certificate") for view number v and becomes locked on this COMMIT2 certificate (rather than the previous COMMIT certificate). The replica then sends a COMMIT2 vote with the COMMIT2 certificate to all other replicas (block 422).

Turning now to block 424 of FIG. 4B, if 2f+1 COMMIT2 votes are generated/received by the replicas for a given COMMIT2 certificate within a predetermined timeout period, the proposal embodied in the COMMIT2 certificate becomes a consensus decision for the client request (i.e., the proposal is deemed to be agreed upon by all non-faulty replicas) (block 426) and workflow 400 ends.

However, if 2f+1 COMMIT2 votes are not generated/received by the replicas for a given COMMIT2 certificate within the predetermined timeout period, a view-change is initiated. Thus, the current view number v is incremented to v+1, a new proposer is selected for view number v+1, and each replica sends a NEW-VIEW message carrying the COMMIT or COMMIT2 certificate it is locked on (if any) to the new proposer (block 428). If the replica created a COMMIT2 certificate per block 420, it will be locked on that COMMIT2 certificate at this point and will include the COMMIT2 certificate in its NEW-VIEW message.

Upon receiving n-f (2f+1 in the case where n=3f+1) NEW-VIEW messages from the various replicas, the new proposer determines the single highest COMMIT or COMMIT2 certificate included in the received NEW-VIEW messages (i.e., the COMMIT or COMMIT2 certificate having the highest/newest view number). The new proposer then adds this single highest COMMIT/COMMIT2 certificate into a new PREPARE message and transmits the new PREPARE message to all of the other replicas (block 430), and workflow 400 loops back to block 406 of FIG. 4A (where each replica receives the PREPARE message).

At block 408 of FIG. 4A, each receiving replica determines whether it already holds a lock on a COMMIT2 certificate. If so, the replica releases the lock if the COMMIT/COMMIT2 certificate in the PREPARE message has a higher view number than the replica's currently locked COMMIT2 certificate (block 410). Finally, the replica accepts the proposal embodied by the PREPARE message if (A) the replica does not already hold a lock or (B) it holds a lock on a certificate (either COMMIT or COMMIT2) having a view number equal to the view number of the COMMIT/COMMIT2 certificate in the PREPARE message (block 412), and workflow 400 proceeds from that point as described previously.

To clarify why workflow 400 of FIGS. 4A and 4B overcome the limitations of workflow 300 with respect to optimistic responsiveness, consider the scenario mentioned above pertaining to non-faulty replica R. Assume replica R becomes locked on a COMMIT2 certificate having view number X but all other non-faulty replicas are still locked on a COMMIT2 certificate having a view number less than X. In this case, due to the sequencing of the COMMIT2 voting round after the COMMIT voting round in workflow 400, 2f+1 COMMIT votes having a COMMIT certificate associated with view number X are guaranteed to be generated/received by the time replica R is able to lock onto a COMMIT2 certificate having view number X. This, in turn, means that the first n-f NEW-VIEW messages received by a new proposer are guaranteed to include at least one COMMIT certificate having view number X, which is added into the PREPARE message created by the proposer. Thus, replica R receives this PREPARE message with a COMMIT certificate having view number X (which is equal to the view number of its locked COMMIT2 certificate) and accepts the proposal, thereby ensuring forward progress for the protocol.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing linear view-change with optimistic responsiveness in a Byzantine Fault Tolerant (BFT) protocol running on a distributed system comprising n replicas, wherein no more than f of the n replicas are faulty, and wherein the BFT protocol enables at least 2f+1 of the n replicas to agree on how to sequence execution of a plurality of service operations originating from one or more clients, the method comprising:

executing, by the n replicas during a view v of the BFT protocol, a first voting round comprising communicating instances of a first type of COMMIT certificate among the n replicas;

when 2f+1 instances of the first type of COMMIT certificate associated with the view v have been received by the n replicas, executing a second voting round comprising communicating instances of a second type of COMMIT certificate among the n replicas; and if 2f+1 instances of the second type of COMMIT certificate associated with the view v are not received by the n replicas within a predetermined timeout period, initiating a view-change from the view v to a view v+1.

2. The method of claim 1 wherein initiating the view-change comprises:

generating, by a replica in the n replicas corresponding to a new proposer for the view v+1, a PREPARE message comprising a single instance of the first type of COMMIT certificate or the second type of COMMIT certificate, the single instance corresponding to an instance of the first type or the second type that has the highest view number the new proposer is aware of at the time of the view-change; and transmitting, by the new proposer, the PREPARE message with the single instance of the first type of COMMIT certificate or the second type of COMMIT certificate to all other replicas in the n replicas.

3. The method of claim 2 wherein the BFT protocol is Practical BFT and wherein executing the steps of claim 2 result in a linear reduction in communication bit complexity for the view-change over Practical BFT.

4. The method of claim 2 wherein the single instance is one of an initial n-f instances of the first type or the second type received by the new proposer from other replicas in the n replicas.

5. The method of claim 1 wherein if the single instance is an instance of the first type of COMMIT certificate, the single instance comprises 2f+1 PREPARE votes for a proposed sequence number for a service operation invoked by a client in the one or more clients, each PREPARE vote including a signed digest of the proposed sequence number, and wherein if the single instance is an instance of the second type of COMMIT certificate, the single instance comprises 2f+1 COMMIT votes corresponding to the first type of COMMIT certificate.

6. The method of claim 2 wherein, upon receiving the PREPARE message at a replica r, the replica r determines whether it already holds a lock on an instance of the second type of COMMIT certificate.

7. The method of claim 6 wherein if the replica r already holds a lock on the instance of the second type of COMMIT certificate, the replica r releases the lock if the single instance included in the PREPARE message has a higher view number than the instance of the second type of COMMIT certificate.

8. A non-transitory computer readable storage medium having stored thereon program code embodying a method for implementing linear view-change with optimistic responsiveness in a Byzantine Fault Tolerant (BFT) protocol running on a distributed system comprising n replicas, wherein no more than f of the n replicas are faulty, and wherein the BFT protocol enables at least 2f+1 of the n replicas to agree on how to sequence execution of a plurality of service operations originating from one or more clients, the method comprising:

executing, by the n replicas during a view v of the BFT protocol, a first voting round comprising communicating instances of a first type of COMMIT certificate among the n replicas;

when 2f+1 instances of the first type of COMMIT certificate associated with the view v have been received by the n replicas, executing a second voting round comprising communicating instances of a second type of COMMIT certificate among the n replicas; and if 2f+1 instances of the second type of COMMIT certificate associated with the view v are not received by the n replicas within a predetermined timeout period, initiating a view-change from the view v to a view v+1.

9. The non-transitory computer readable storage medium of claim 8 wherein initiating the view-change comprises:

generating, by a replica in the n replicas corresponding to a new proposer for the view v+1, a PREPARE message comprising a single instance of the first type of COMMIT certificate or the second type of COMMIT certificate, the single instance corresponding to an instance of the first type or the second type that has the highest view number the new proposer is aware of at the time of the view-change; and transmitting, by the new proposer, the PREPARE message with the single instance of the first type of COMMIT certificate or the second type of COMMIT certificate to all other replicas in the n replicas.

10. The non-transitory computer readable storage medium of claim 9 wherein the BFT protocol is Practical BFT and wherein executing the steps of claim 9 result in a linear reduction in communication bit complexity for the view-change over Practical BFT.

11. The non-transitory computer readable storage medium of claim 9 wherein the single instance is one of an initial n-f instances of the first type or the second type received by the new proposer from other replicas in the n replicas.

12. The non-transitory computer readable storage medium of claim 8 wherein if the single instance is an instance of the first type of COMMIT certificate, the single instance comprises 2f+1 PREPARE votes for a proposed sequence number for a service operation invoked by a client in the one or more clients, each PREPARE vote including a signed digest of the proposed sequence number, and wherein if the single instance is an instance of the second type of COMMIT certificate, the single instance comprises 2f+1 COMMIT votes corresponding to the first type of COMMIT certificate.

13. The non-transitory computer readable storage medium of claim 9 wherein, upon receiving the PREPARE message at a replica r, the replica r determines whether it already holds a lock on an instance of the second type of COMMIT certificate.

14. The non-transitory computer readable storage medium of claim 13 wherein if the replica r already holds a lock on the instance of the second type of COMMIT certificate, the replica r releases the lock if the single instance included in the PREPARE message has a higher view number than the instance of the second type of COMMIT certificate.

15. A distributed system comprising:

n replicas; and a non-transitory computer readable medium having stored thereon program code that, when executed, enables the distributed system to implement linear view-change with optimistic responsiveness in a Byzantine Fault Tolerant (BFT) protocol running on the distributed system, wherein no more than f of the n replicas are faulty, and wherein the BFT protocol enables at least 2f+1 of the n replicas to agree on how to sequence execution of a plurality of service operations originating from one or more clients, the program code causing the distributed system to:

execute, during a view v of the BFT protocol, a first voting round comprising communicating instances of a first type of COMMIT certificate among the n replicas;

when 2f+1 instances of the first type of COMMIT certificate associated with the view v have been received by the n replicas, execute a second voting round comprising communicating instances of a second type of COMMIT certificate among the n replicas; and if 2f+1 instances of the second type of COMMIT certificate associated with the view v are not received by the n replicas within a predetermined timeout period, initiate a view-change from the view v to a view v+1.

16. The distributed system of claim 15 wherein the program code that causes the distributed system to initiate the view-change comprises program code that causes the distributed system to:

generate, by a replica in the n replicas corresponding to a new proposer for the view v+1, a PREPARE message comprising a single instance of the first type of COMMIT certificate or the second type of COMMIT certificate, the single instance corresponding to an instance of the first type or the second type that has the highest view number the new proposer is aware of at the time of the view-change; and transmit, by the new proposer, the PREPARE message with the single instance of the first type of COMMIT certificate or the second type of COMMIT certificate to all other replicas in the n replicas.

17. The distributed system of claim 16 wherein the BFT protocol is Practical BFT and wherein executing the steps of claim 16 result in a linear reduction in communication bit complexity for the view-change over Practical BFT.

18. The distributed system of claim 16 wherein the single instance is one of an initial n-f instances of the first type or the second type received by the new proposer from other replicas in the n replicas.

19. The distributed system of claim 15 wherein if the single instance is an instance of the first type of COMMIT certificate, the single instance comprises 2f+1 PREPARE votes for a proposed sequence number for a service operation invoked by a client in the one or more clients, each PREPARE vote including a signed digest of the proposed sequence number, and wherein if the single instance is an instance of the second type of COMMIT certificate, the single instance comprises 2f+1 COMMIT votes corresponding to the first type of COMMIT certificate.

20. The distributed system of claim 16 wherein, upon receiving the PREPARE message at a replica r, the replica r determines whether it already holds a lock on an instance of the second type of COMMIT certificate.

21. The distributed system of claim 20 wherein if the replica r already holds a lock on the instance of the second type of COMMIT certificate, the replica r releases the lock if the single instance included in the PREPARE message has a higher view number than the instance of the second type of COMMIT certificate.

* * * * *